Dec. 3, 1957 T. S. SPRAGUE ET AL 2,815,007
SYNTHESIS GAS GENERATOR
Filed Dec. 12, 1951 2 Sheets-Sheet 1

INVENTORS
Theodore S. Sprague
BY Charles L. Marquez, Jr.
ATTORNEY

Dec. 3, 1957 T. S. SPRAGUE ET AL 2,815,007
SYNTHESIS GAS GENERATOR
Filed Dec. 12, 1951 2 Sheets-Sheet 2

INVENTOR.
Theodore S. Sprague
BY Charles L. Marquez, Jr.
ATTORNEY

United States Patent Office 2,815,007
Patented Dec. 3, 1957

2,815,007

SYNTHESIS GAS GENERATOR

Theodore S. Sprague, Hewlett, N. Y., and Charles L. Marquez, Jr., Jersey City, N. J., assignors to The Babcock & Wilcox Company, Rockleigh, N. J., a corporation of New Jersey Application December 12, 1951, Serial No. 261,312

13 Claims. (Cl. 122—343)

This invention relates to the construction and operation of synthesis gas generators, and more particularly to improvements in a superheated steam generator constructed and arranged to reclaim heat from the synthesis gas produced in the synthesis gas reactor section, and to produce superheated steam for use in the gas synthesis process and for other uses, such as for power generation.

The invention steam generator is particularly adapted for use with the two stage reaction process and apparatus described and claimed in the copending application of P. R. Grossman and T. S. Sprague, Serial No. 225,346, filed May 10, 1951, for "Method of and Apparatus for Gasification of Pulverized Coal," now Patent No. 2,801,158, issued July 30, 1957, and will be described with particular reference to the method and apparatus of such application. It should be understood, however, that such particular cooperation is exemplary only, and not by way of limitation, as the invention steam generator is useful with other synthesis gas reactors as well as with other sources of heat.

The reaction of the pulverized coal with steam and $CO_2$ is endothermic in nature, thus requiring a net heat input to raise the temperature of the reactants to the reaction temperature range. This temperature increase may be effected by an exothermic reaction involving partial combustion of the coal utilizing a quantity of oxygen insufficient for complete combustion.

The most effective temperature range for the endothermic reaction is in excess of 2000° F., and the combustion temperature must be substantially above this range to insure that enough sensible heat be imparted to the reactants to maintain the temperature in the range during which gasification progresses rapidly.

As a result of these foregoing considerations, the temperature of the synthesis gas produced is relatively high and may be of the order of 2000° F. or more. The sensible heat of the exiting gases must be extracted to cool the synthesis gas to a much lower handling temperature, for example, of the order of 400° F.

A superheated steam generator integrated with a synthesis gas reactor is particularly advantageous in a gas synthesis process utilizing coal, such as that described and claimed in said copending application. In such case, the steam generator not only provides a supply of superheated process steam at a controlled optimum temperature but also provides water tube protection for the enclosing pressure shell, reduces the temperature of the delivered synthesis gas to an optimum low value to assure a good overall thermal efficiency of the unit, provides a supply of superheated steam in excess of the synthesis process requirements so that steam is available for other process or power work, and provides means whereby the reaction chambers may be operated at optimum high temperatures above ash slagging temperatures and the heat absorbing surfaces below slagging temperatures.

In accordance with the invention, the foregoing results are effected by providing an integrated steam generator including water tubes lying along and protecting the interior of the cylindrical shell, and heat absorbing water and steam heating tubes including an economizer arranged in multiple banks with up-flow of water in an annular down-flow gas pass, an annular multiple tube natural circulation multiple pass boiler, a primary low temperature platen type superheater positioned in the path of the hot reacted gas and handling all the steam from the drum, and a secondary high temperature convection superheater arranged in an annulus and handling that portion of the steam to be heated to a maximum temperature.

Control of the final temperature of steam leaving the high temperature superheater is effected by attemperation intermediate the two superheaters. Gas recirculation is provided to a point in the reactant gas flow path in advance of the primary superheater, and such recirculation provides a control means to modify the heat absorption by the superheaters. The absorption by the primary superheater is largely radiant absorption due to the wide spacing of the platens. The gas recirculation shifts some of the heat absorption into the convection superheater surface, and thus provides a regulation of the temperature of the steam leaving superheaters and limits the heat input to the tubes of the latter. Such recirculation of gases, by reducing the temperatures at the primary superheater, avoids slagging of the latter by molten ash entrained in the gas.

For an understanding of the invention principles, reference is made to the following description of a typical embodiment thereof as illustrated in the accompanying drawing.

Figure 1:
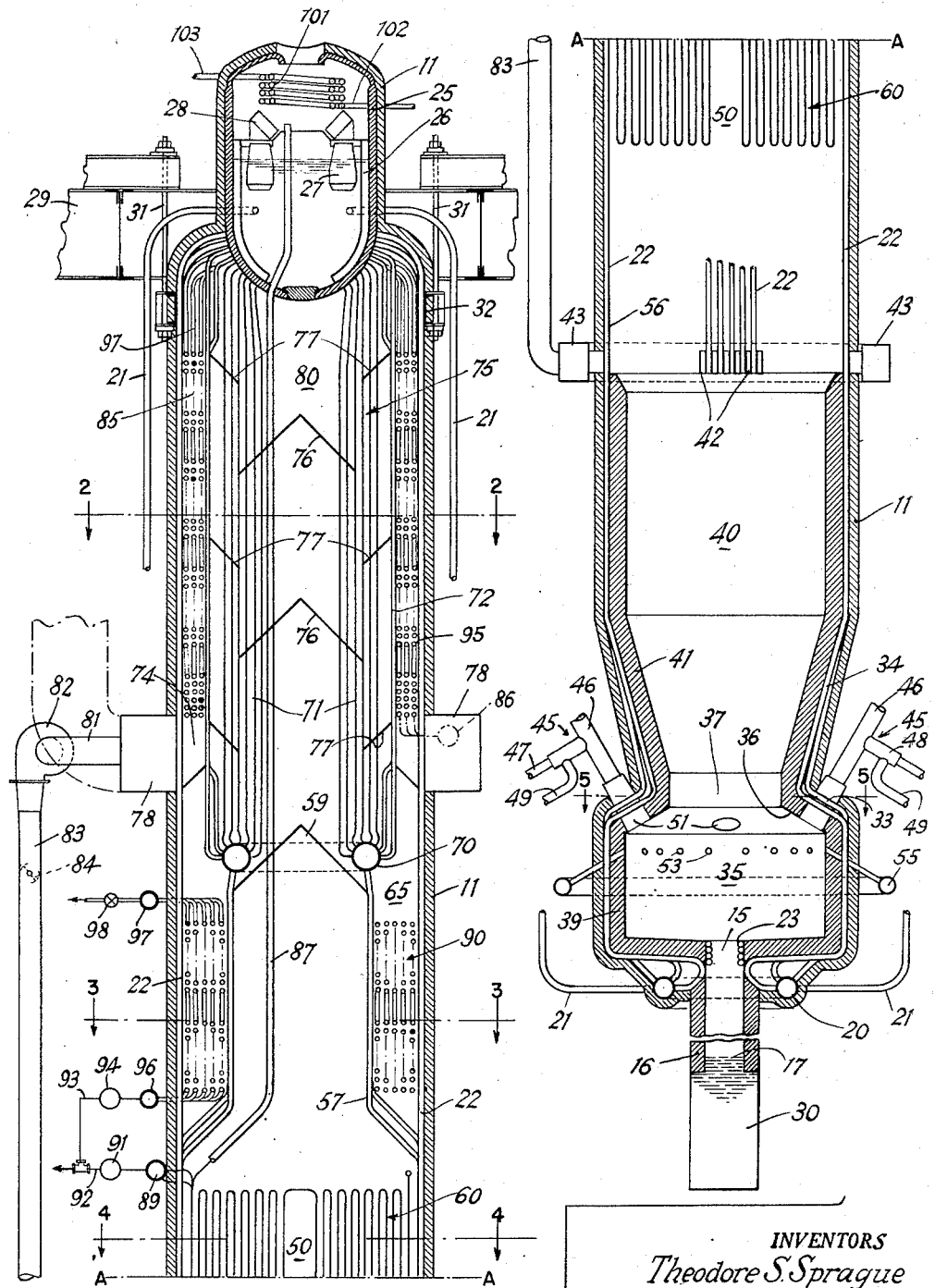
Fig. 1 is an axial sectional view of a synthesis gas reactor embodying the invention.

Referring to the drawings, the steam generator and the reaction unit with which it is integrated are substantially completely enclosed within an upright elongated cylindrical metal shell 10 having a layer of suitable heat insulation material 11 covering its outer surface. The bottom end of shell 10 is generally hopper shaped, and forms the periphery of an axial slag outlet 15. The slag outlet is surrounded by an annular header 20 covered by the insulation 11. The upper end of shell 10 is turned inwardly to form an opening closed by an axially upright liquid and vapor drum 25 whose outer surface is covered with the heat insulation material 11.

For a purpose to be described, the cylindrical wall of shell 10, at a zone a relatively short distance above the slag outlet 15, is bent inwardly at a relatively sharp angle to its axis, and then bent outwardly to its original diameter.

The slag outlet communicates with a slag disposal well, collection receptacle, or ash can 30 whose upper end, adjacent outlet 15, is lined with refractory 16. The slag disposal chamber contains a suitable liquid, such as water, as indicated at 17, which chills to a solid the molten slag dropping into the water from outlet 15. The solidified slag may be removed from chamber 30, either continuously or periodically, by suitable means which have not been illustrated as they form no part of the present invention.

Downcomers 21 extend between the liquid space of drum 25 and annular header 20, these downcomers being preferably located exteriorly of shell 10. The interior surface of the shell is lined with shell protecting tubes 22 arranged as a cylindrical bank substantially covering the inner surface of shell 10 and defining the generating chamber. These tubes 22 are connected, at their lower ends, to header 20, some of the tubes being inwardly offset and exposed, as at 23, to define part of the slag outlet 15 and absorb heat from the slag and any gases flowing through outlet 15. The upper ends of tubes 22 communicate with steam-water compartments 26 whose exits lead to cyclone separators 27 communicating, through scrubbers 28, with the vapor space of drum 25. The cyclone separators separate the vapor from the liquid, returning the liquid to the liquid space of drum 25 and directing the vapor to the vapor space of the drum. The unit may be suitably supported by a structural framework generally indicated at 29 and having hangers 31 secured to structural elements 32 connected to shell 10.

Tubes 22 are bent radially inwardly and then outwardly, conforming to the surface of shell 10, as indicated at 33 and 34. The inwardly offset portions of the risers and shell 10 define the roof 36 and a restricted gas outlet or throat 37 of a primary or combustion chamber 35, the throat 37 being succeeded by an expansion section at the entrance to secondary or reaction chamber 40. Throat 37 assures thorough mixing of the reactants flowing therethrough and the velocity of the reactant stream is increased in flowing through the throat to form a high velocity barrier inhibiting recirculation of the reactants and synthesis gas into chamber 35.

The primary chamber 35, including its bottom surface and its roof 36, and throat 37 are lined with suitable slag resistant refractory material 39 covering risers 22. Lining 39 is continued upwardly beyond the restricted throat 37, as indicated at 41, terminating just short of a series of circumferentially spaced ports 42 communicating with a duct 43. Lining 41 defines the secondary or reaction chamber 40.

In the particular arrangement shown by way of example only, a plurality of burners 45 are arranged to extend through roof 36 in circumferentially spaced relation, with their outlets being directed downwardly toward slag outlet 15. These burners and their arrangement and orientation may be as described and claimed in the aforesaid Patent No. 2,801,158. As set forth in said patent, finely pulverized fuel is delivered to each burner 45 through a coal pipe 46. Steam is delivered through a conduit 47 surrounded by a conduit 48 receiving oxygen from the supply line 49. The relatively high velocity steam and oxygen stream is directed into a venturi nozzle (not shown) disposed within a coolant jacketed burner nozzle 51 to entrain the pulverized coal particles and deliver these particles in suspension in the stream of oxygen and steam directed downwardly toward slag outlet 15. The venturi exit section of the burners provides for reception of the coal at atmospheric pressure for delivery to the burners and discharge from the burners even into a superatmospheric pressure region.

During the preponderantly exothermic reaction of the coal, oxygen and steam in chamber 35, the temperature level of the reactants is raised to a value within or above the optimum temperature range for the subsequent preponderantly endothermic reaction in chamber 40, this temperature range being in excess of 2000° F. The high temperature stream of gases, including any unburned or partially burned fuel particles, moves upwardly toward gas outlet 37. Just in advance of the gas outlet, a portion of the reaction steam requirements may be admixed with the rising gas stream in such manner that substantially complete mixing therewith is effected. This is accomplished by a series of steam inlet ports 53 arranged around the circumference of chamber 35 at the general zone of burners 45. The steam ports are preferably located circumferentially intermediate the burners 45, and direct the steam inwardly and upwardly toward restricted outlet 37. Steam is supplied to the ports from a header 55 under suitable flow control.

Steam supplied through ports 53 becomes thoroughly mixed with the rising stream of gaseous products of combustion and unburned fuel particles in the throat 37, so that the steam comes into intimate contact with the highly heated reactants included in the gas stream. The velocity of the gas stream increases substantially in flowing through throat 37 to form a high velocity barrier inhibiting recirculation of the reactant gases through the throat into chamber 35. The gradually diverging expansion section following the throat inhibits formation of eddy currents thus avoiding recirculation of fully reacted gas into the stream leaving the throat.

The hot gas leaving the reaction chamber delivers heat to a relatively extended radiant fluid heating section 56 comprising the bare portions of tubes 22 above chamber 40 and forming a cylindrical gas pass 50 in which is located a primary low temperature superheater 60 of the platen type described more fully hereinafter.

At the upper end of gas pass 50, some of the tubes 22 are bent radially inwardly and then axially, with the axially extending sections 57 being covered by refractory 58, to form, with the other tubes 22 lying along the inner surface of shell 10, an annular gas pass 65. The upper end of the cylindrical space defined by offset tubes 57 and refractory 58 is closed by a suitable baffle 59 so that the gas passes upwardly through the annular pass 65. The closed space terminated by baffle 59 results in reentrant gas flow producing some cooling of the gases before they flow into gas pass 65, and thus reducing the required overall height of the unit.

Figure 2:
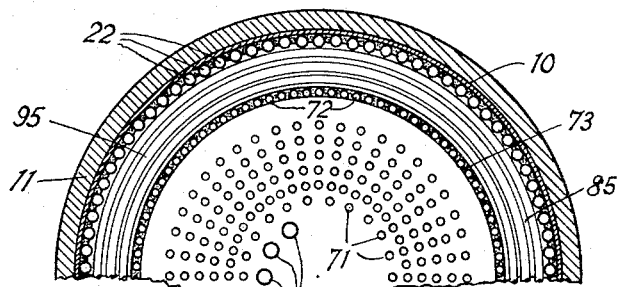
Figs. 2, 3, 4 and 5 are diametrical sectional views on the correspondingly numbered lines of Fig. 1.
Figure 4:
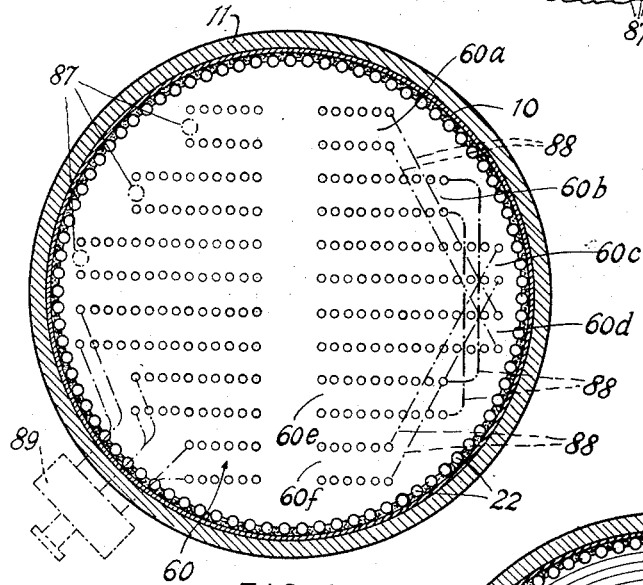

The upper ends of offset tubes 57 are connected into a circular header 70 forming the lower water supply header of a convection section generally indicated at 75. This convection section comprises a circular bank of tubes 71 extending upwardly from header 70. As shown in Fig. 2, tubes 71 are arranged in a plurality of radial rows throughout the major portions of their lengths. A single circular row of tubes 72 is spaced radially outwardly from the outermost tubes 71 to provide a gas flow space. Alternate tubes 72 have offset upper and lower end portions (Fig. 1) providing intertube gas flow spaces therebetween, and the straight intermediate portions of tube 72 have their intertube spaces closed by refractory 73 to form a gas tight wall. Tubes 71 and 72 are connected at their upper ends into the upright steam and water drum 25. The cylindrical tube-and-refractory wall 72—73 encloses a cylindrical chamber 80 within which convection section 75 is disposed and forms, with the wall protecting tubes 22 lying along the inner surface of shell 10, an annular gas pass space 85. The lower end 74 of gas pass 85 is connected, through a plurality of circumferentially arranged ports between tubes 22 and through the wall of shell 10, to a gas outlet breeching 78. A plurality of oppositely inclined baffles 76 and 77 are disposed across the convection tube bank within pass 80 to effect a cross flow of gas with respect to the tubes of convection section 75.

A two-section spiral high temperature superheater section 90 is disposed in annular gas pass 65 so that the gases leaving the low temperature superheater section 60, and still at a relatively high temperature, flow over superheater section 90 to impart additional superheat to the steam flowing therethrough. The gases leaving the upper end of annular pass 65 flow in a plurality of passes across convection tube banks 71 and 72 into the central space 80. The gases leave space 80 at the upper end thereof, flowing outwardly over the convection tube banks and then downwardly through annular gas pass 85 to gas outlet breeching 78. A four-section spiral economizer 95 is disposed within gas pass 85 so that the gases flowing downwardly through this pass give up heat to the feed water flowing through the tubes of the economizer before the gases pass through the breeching 78. The heat absorbing surfaces are so arranged and proportioned that the gases entering breeching 78 are at a temperature of approximately 400° F.

From the breeching 78, the cooled synthesis gas may be led to storage or to further processing or consumption apparatus. In order to effect a control of the heat absorption between the superheater and the vapor generator, a portion of the gas stream flowing from the economizer or the breeching 78 may be recirculated to the upper portion of chamber 40 as required. An arrangement for such recirculation is indicated as comprising a conduit 81 connected to breeching 78 and leading to the inlet of blower 82. The discharge of blower 82 is connected to a conduit 83 having a damper 84 therein, with the conduit arranged to discharge to the recirculation gas duct 43. By means of the fan and conduits, some of the synthesis gas may be introduced through ports 42 into the upper portion of the reaction chamber 40 for admixture with the gases originating from the lower portion of the chamber.

The liquid flow path is as follows. Feed water at a temperature of approximately 230° F., for example, is delivered to the economizer through a header 86. The economizer as shown as a plurality (3) of water flow paths or tubes receiving their supply from the inlet header 86 and discharging at their upper ends to the steam and water drum through connections 97.

The three tubes at their inlet ends are arranged in radially spaced positions across the gas pass 85. Each of the three tubes are helical in conformation, passing in their initial radially spaced positions circumferentially about the pass so that five circuits are made in the lowermost economizer section. The several sections are upwardly spaced from one another to provide a space for the insertion of soot blowers positioned radially of the shell. The second section has a corresponding set of three radially spaced tubes serially connected with corresponding tubes of the first section. The sets of tubes make some 10 convolutions in the second, third and uppermost sections of the economizer. The tubes of the uppermost section discharge to the steam and water drum to a position within the central water space. The uppermost section of the economizer receives heating gases from the space 80 and as the gases flow downwardly over the several sections in counter-current relation to the general upflow of water, effective cooling of the gases is accomplished.

Figure 3:
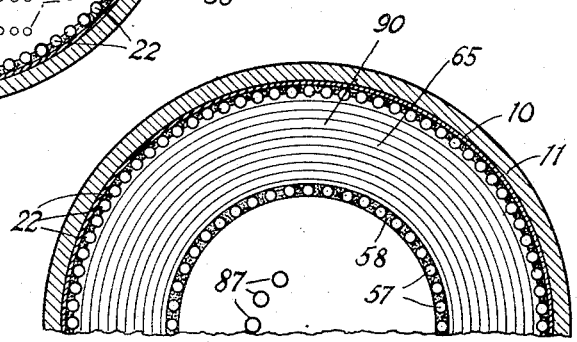
Figure 5:
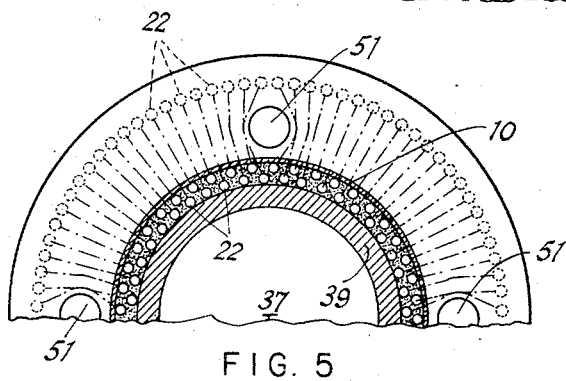

Saturated steam, generated primarily in the convection section 75, is delivered from the steam space of drum 25 through a plurality of saturated steam connections 87 extending downward from the steam space through the bottom end of the steam and water drum and through the central space 80 to the low temperature superheater 60. This is a suspended platen type superheater having platens of multiple loops serially connected for steam flow therethrough and with the platens on widely spaced centers so that the heat absorption from the gases is largely radiant. Twelve (12) platens are provided and three (3) saturated supply connections 87 supply three (3) pairs of platens. Thus each saturated supply tube 87 is bifurcated at its lower end to connect to the inlet tube end of two platens. The individual platens of the pairs have been designated 60a, 60b and 60c. At the right side of platen 60a, as viewed in Fig. 3, the platens are cross-connected, as at 88, so that the pairs of platens 60a are cross-connected to platens 60d, the pairs of platens 60b are cross-connected to platens 60e, and the pairs of platens 60c are cross-connected to platens 60f. It will be noted that these cross-connections, as for example those connecting platens 60a in series with platens 60d, provide steam flow parallel paths which are substantially equal in length compared with the flow paths of the other serially connected pairs. The serially connected platens are also spaced in positions of possible different temperatures of the hot gas stream so as to equalize heat absorption.

Superheater 60 is arranged to heat all of the saturated steam to a temperature of at least 750° F., and comprises platens of 2½" O. D. tubes with 3¾" tube-to-tube back spacing with the platens on 9" centers. Steam from pairs of platens 60d—60f is delivered to the outlet header 89.

As the steam generation, particularly at higher gas outputs of the synthesis gas generator, is in excess of that required in the synthesis process, a pipe line 92 for the delivery of this excess for use in power generation or other uses is connected to the outlet header 89. An attemperator 91 is arranged between the outlet header 89 and the pipe 92 to provide a limiting control on the temperature of the steam delivered to such outside use. This attemperator may be of the spray type as shown by the Fletcher and Huge Patent 2,550,683. The steam utilized in the synthesis process, which in the example chosen would amount to approximately 22,000 lbs. per hour, is directed through a branch pipe line 93 and a second spray attemperator 94 to the inlet header 96 of high temperature superheater 90 which consists of a plurality of tubes of spiral conformation arranged in the annular gas pass 65. This superheater is constructed similarly to the economizer and comprises five (5) tube lengths radially spaced with respect to each other and located in the annular gas pass 65, extending helically upward therein in eight (8) convolutions in the lower section and eight (8) convolutions in the upper section. The steam flows upwardly through the lower section and the upper section so that the general direction of steam flow is in the same general direction as the gas flow. The pressure of the steam delivery from the outlet header 97 of the superheater 90 is regulated by an automatic pressure control valve 98 to give a delivery pressure of the order of 25 lb./sq. in. and the outlet steam temperature may be regulated by the attemperator 94 to the desired degree of the order of 1400° F. The superheater 90 consists of five (5) tubes arranged in parallel as regards steam flow, the tubes being 2½" O. D. on 4½" radial spacing and 4" vertical spacing between tube lengths.

The reactant gases leaving chamber 40 may be, in a typical example, at a temperature of substantially 2500° F. The gas temperature is reduced to about 1900° F. by absorption of heat by radiant section 56 of wall tubes 22 and by mixing with about 30% of flue gas at 400° F. recirculated from breeching 78 through conduit 83 to ports 42. Such recirculation reduces the gas temperature entering superheater 60 to thus decrease the required overall height of the unit as compared to the height required without gas recirculation. In the example chosen, this height reduction may be 20 feet. Gas leaving superheater 60 and entering annular pass 65 after some eddying in the space immediately below baffle 59 is at approximately 1650° F. After flowing over high temperature superheater 90, convection steam generating section 75, and economizer 95, the gas exit temperature is about 400° F.

In order to further improve the efficiency of the apparatus when used in the production of synthesis gas by the partial combustion of coal in the presence of oxygen and steam, a preheating coil for the process oxygen may be disposed in the vapor or steam space of drum 25. This coil, indicated at 101, may comprise, for example, approximately one hundred feet (100′) of two inch (2″) O. D. tubing arranged as a coil in the steam space to heat approximately 16,500 lbs./hr. of oxygen from 80° F. to 480° F. by condensing steam. Oxygen from a suitable source is brought to coil 101 through inlet leads 102. The thus preheated oxygen is delivered from coil 101 through an outlet lead 103 connected in a suitable manner (not shown), to the oxygen supply conduits 49 of burners 45. The preheating of the oxygen increases the efficiency of the reaction in chamber 35.

While a specific embodiment of the invention has been shown and described in detail to illustrate the application of the invention principles, it will be understood that the invention may be otherwise embodied without departing from such principles.

We claim:

1. A vapor generating unit comprising, in combination, a vertically elongated shell of curvilinear cross section enclosing means at its lower end for supplying a stream of high temperature gaseous combustion products;

a chamber intermediate the height of said shell for receiving gaseous combustion products at its lower end and having a gas outlet at its upper end; a tubular vapor generating section positioned within the shell at a position above the gas outlet and receiving heating gases therethrough, said vapor generating section comprising a plurality of radially extending rows of upright tubes; a vapor and liquid drum at a position above said tubes and connected thereto to receive heated fluid therefrom; a circular liquid supply header connected to the lower ends of said tubes; liquid supply means connecting the liquid supply space of said drum to said header; a vapor superheater connected to receive vapor from the vapor space of said drum and comprising a plurality of spaced, upright multiple tube length platens positioned within the shell and in the gas flow path from the gas outlet to the vapor generating section; a circular cross-section row of fluid cooled tubes in concentric spaced relation to and within the shell, and connected to said drum; an upwardly extending annular gas flow pass formed between the shell and said circular cross-section row of fluid cooled tubes, said gas pass directing the gases from said outlet to said vapor generating section; a convection vapor superheater disposed in said annular gas pass and comprising a plurality of circumferentially extending tubes; and conduit means connecting the vapor space of said drum to the vapor inlet of one superheater and connecting the vapor outlet of said one superheater to the vapor inlet of the other superheater.

2. A vapor generating unit comprising, in combination, a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a tubular vapor generating section positioned within the shell at a position above the gas outlet and receiving heating gases therethrough, said vapor generating section comprising a plurality of radially extending rows of upright tubes; a vapor and liquid drum at a position above said tubes and connected thereto to receive heated fluid therefrom; a circular liquid supply header connected to the lower ends of said tubes; liquid supply means connecting the liquid supply space of said drum to said header; a vapor superheater connected to receive vapor from the vapor space of said drum and comprising a plurality of spaced, upright multiple tube length platens positioned within the shell and in the gas flow path from the gas outlet to the vapor generating section; a circular cross-section row of fluid cooled tubes in concentric spaced relation to and within the shell, and connected to said drum; an upwardly extending annular gas flow pass formed between the shell and said circular cross section row of fluid cooled tubes, said gas pass directing the gases from said outlet to said vapor generating section; a convection vapor superheater disposed in said annular gas pass and comprising a plurality of circumferentially extending tubes; and conduit means connecting the vapor space of said drum to the vapor inlet of said platen superheater and connecting the vapor outlet of said one superheater to the vapor inlet of the convection superheater.

3. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said upright tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a multiple tube vapor superheater positioned in said annular gas pass; and a platen vapor superheater positioned in the gas flow path in advance of said annular pass.

4. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a second upwardly extending annular gas pass having its outside defined by an upper section of said shell and its inner side by a circular row of upright tubes connected between said header and said drum; a gas flow connection from the gas outlet of said bank to the upper end of said second annular gas pass; a gas outlet from the lower end of said second annular gas pass; and a multiple tube feed liquid heater located in said second annular gas pass and arranged to receive feed liquid and deliver it to the liquid space of said drum.

5. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a second upwardly extending annular gas pass having its outside defined by an upper section of said shell and its inner side by a circular row of upright tubes connected between said header and said drum; a gas flow connection from the gas outlet of said bank to the upper end of said second annular gas pass; a gas outlet from the lower end of said second annular gas pass; a multiple tube feed liquid heater located in said second annular gas pass and arranged to receive feed liquid and deliver it to the liquid space of said drum; and conduit means connecting the vapor space of said drum to the vapor inlet of said platen superheater and connecting the vapor outlet of said platen superheater to the vapor inlet of the convection superheater.

6. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a second upwardly extending annular gas pass having its outside defined by an upper section of said shell and its inner side by a circular row of upright tubes connected between said header and said drum; a gas flow connection from the gas outlet of said bank to the upper end of said second annular gas pass; a gas outlet from the lower end of said second annular gas pass; a multiple tube feed liquid heater located in said second annular gas pass and arranged to receive feed liquid and deliver it to the liquid space of said drum; and conduit means connecting the vapor space of said drum to the vapor inlet of said platen superheater and connecting the vapor outlet of said platen superheater to the vapor inlet of the multiple tube superheater.

7. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a second upwardly extending annular gas pass having its outside defined by an upper section of said shell and its inner side by a circular row of upright tubes connected between said header and said drum; a gas flow connection from the gas outlet of said bank to the upper end of said second annular gas pass; a gas outlet from the lower end of said second annular gas pass; a multiple tube feed liquid heater located in said second annular gas pass and arranged to receive feed liquid and deliver it to the liquid space of said drum; and means communicating with the last-named gas outlet and said chamber adjacent the gas outlet of the latter for recirculating gas through said heat exchanger and said second annular pass.

8. A vapor generating unit comprising, in combination a vertically elongated shell of curvilinear cross section enclosing means at its lower end for supplying a stream of high temperature gaseous combustion products; a chamber intermediate the height of said shell for receiving gaseous combustion products at its lower end and having a gas outlet at its upper end; a multiple gas pass tubular heat exchanger, including vapor generating and vapor superheating sections positioned above the outlet; an upwardly extending annular gas pass having its outside defined by a vertical section of said shell and its inner side by a row of fluid heating tubes; a vapor generating section positioned within said shell above said annular gas pass and comprising a bank of upright tubes; a vapor and liquid drum at a position above said tubes and connected thereto to receive heated fluid therefrom; a liquid supply header connected to the lower ends of said tubes and to the liquid space of said drum; baffle means directing gases from the upper end of said annular gas pass across the lower ends of said tubes; additional baffle means extending in part across intertube spaces of said bank and directing the gases in a plurality of gas passes over said tubes; a second upwardly extending annular gas pass having its outside defined by an upper section of said shell and its inner side by a circular row of upright tubes connected between said header and said drum; a gas flow connection from the gas outlet of said bank to the upper end of said second annular gas pass; a gas outlet from the lower end of said second annular gas pass; a multiple tube feed liquid heater located in said second annular gas pass and arranged to receive feed liquid and deliver it to the liquid space of said drum; conduit means connecting the vapor space of said drum to the vapor inlet of said platen superheater and connecting the vapor outlet of said platen superheater to the vapor inlet of the multiple tubes superheater; and a damper controlled conduit communicating with the last-named gas outlet and said chamber adjacent the gas outlet of the latter for recirculating gas through said heat exchanger and said second annular pass.

9. A steam generating unit comprising, in combination, a vertically elongated cylindrical shell enclosing a primary chamber having a gas outlet at its upper end, means for burning fuel in said chamber, means in said shell forming first and second axially spaced annular gas passes and a cylindrical gas pass interconnecting said annular passes, said second annular pass communicating with a gas outlet of said shell; and a vapor generator within said shell arranged to extract heat from the gaseous products of combustion, said generator including a liquid and vapor drum at the outer end of said shell, a convection section connected to said drum and disposed in said cylindrical gas pass, a first superheater section disposed in said shell in advance of said first annular gas pass and receiving vapor from said drum, a second superheater section disposed in said first annular gas pass and receiving superheated vapor from said first superheater section, and an economizer disposed in said second annular pass in advance of said outlet.

10. A vapor generating unit comprising, in combination, a vertically elongated shell enclosing means at its lower end for supplying a stream of high temperature gaseous combustion products; a fluid tube cooled chamber intermediate the height of said shell receiving the stream of products of combustion and directing it to a multiple gas pass tubular heat exchanger, including vapor generating and vapor superheating sections; a primary superheater of a plurality of transversely spaced elements comprising serially connected upright tube lengths at the gas outlet of said chamber; a circular cross-section row of fluid cooled tubes in concentric spaced relation to and within the shell, and connected to said drum; a secondary superheater positioned in an annular gas pass between the shell and said row of upright fluid cooled tubes receiving heating gases from the primary superheater; a vapor generating section comprising a plurality of upright liquid tubes arranged in a circular bank to receive gases from said annular gas pass, connected to receive liquid from an elevated vapor and liquid drum and to discharge a mixture of vapor and liquid thereto; conduit connections from the vapor space of said drum to the vapor inlet of said primary superheater; a superheater vapor connection between the vapor outlet of said primary superheater and the vapor inlet of said secondary superheater; an outlet from said superheated vapor connection for connection to a user of superheated vapor; and a conduit leading from the secondary superheater.

11. A vapor generating unit comprising, in combination, walls defining a chamber having a gas outlet; means for introducing a combustible mixture into said chamber of oxygen and superheated steam for combustion to produce heating gases; a shell extending from the gas outlet to receive the gaseous products of such combustion from the chamber, said shell having an outlet for the gases; means in said shell forming three serially arranged gas passes between said chamber gas outlet and said shell outlet; a steam generator within said shell arranged to extract heat from the gaseous products of combustion, said generator including a water and steam drum at the outer end of said shell, a convection section connected to said drum and disposed in the intermediate gas pass, a primary superheater disposed in advance of the initial gas pass and receiving steam from said drum a secondary superheater disposed in the initial gas pass and receiving superheated steam from said primary superheater, and an economizer disposed in the final gas pass in advance of said outlet; a superheated steam connection from the steam outlet of said secondary superheater section; and a fluid heater disposed in the steam space of said drum, and having an inlet connected to a source of oxygen and an outlet.

12. A vapor generating unit comprising, in combination, an upright chamber having a restricted gas outlet in its upper end and a bottom slag outlet; means for introducing a combustible mixture into said chamber for combustion in the chamber to produce heating gases; an elongated cylindrical shell enclosing said chamber and extending substantially coaxially from the gas outlet end thereof to receive the gaseous products of combustion from the gas outlet, said shell having an outlet for the gases; means in said shell forming first and second axially spaced annular gas passes and a cylindrical gas pass interconnecting said annular passes; said second annular pass communicating with said shell outlet; a vapor generator within said shell arranged to extract heat from the gaseous products of combustion, said generator including a liquid and vapor drum at the outer end of said shell, a convection section connected to said drum and disposed in said cylindrical gas pass, a first superheater section disposed in said shell in advance of said first annular gas pass and receiving vapor from said drum, a second superheater section disposed in said first annular gas pass and receiving superheated vapor from said first superheater section, and an economizer disposed in said second annular pass in advance of said outlet; and a superheated vapor connection from the vapor outlet of said second superheater section.

13. A vapor generating unit comprising, in combination, a chamber having a gas outlet in one end and a slag outlet in the opposite end; means for introducing a combustible mixture into said chamber for combustion in the chamber to produce heating gases; an elongated shell enclosing said chamber and extending from the gas outlet end of said chamber to receive the gaseous products of combustion from the gas outlet, said shell having an outlet for the gases; means in said shell forming first and second axially spaced annular gas passes and a cylindrical gas pass interconnecting said annular passes, said second annular pass communicating with said shell outlet; a vapor generator within said shell arranged to extract heat from the gases, said generator including a liquid and vapor drum at the outer end of said shell, a convection section connected to said drum and disposed in said cylindrical gas pass, a first superheater section disposed in said shell in advance of said first annular gas pass and receiving vapor from said drum, a second superheater section disposed in said first annular gas pass and receiving superheated vapor from said first superheater section, and an economizer disposed in said second annular pass in advance of said outlet; means, including a flow control element, connecting said shell outlet to the interior of said shell between the chamber outlet and the first superheater section to recirculate at least a portion of the discharged gases through said vapor generator; and a superheated vapor connection from the vapor outlet of said second superheater section.

References Cited in the file of this patent

UNITED STATES PATENTS

| | | |
|---|---|---|
| 2,046,383 | Huet | July 7, 1936 |
| 2,112,321 | Wood | Mar. 29, 1938 |
| 2,213,185 | Armacost | Sept. 3, 1940 |
| 2,228,938 | Wood | Jan. 14, 1941 |
| 2,375,505 | Throckmorton et al. | May 8, 1945 |
| 2,552,505 | Patterson | May 8, 1951 |
| 2,584,686 | Fabia et al. | Feb. 5, 1952 |
| 2,594,330 | Mayhew | Apr. 29, 1952 |
| 2,632,427 | Mercier | Mar. 24, 1953 |
| 2,672,849 | Fruit | Mar. 23, 1954 |

FOREIGN PATENTS

| | | |
|---|---|---|
| 447,200 | Germany | July 19, 1927 |